Jan. 3, 1939.  D. S. FAHRNEY  2,142,123
EXTENSION WING FLAP
Filed Jan. 5, 1938  3 Sheets-Sheet 1

INVENTOR
Delmer S. Fahrney
BY
Ransom K. Davis
ATTORNEY

Jan. 3, 1939. D. S. FAHRNEY 2,142,123
EXTENSION WING FLAP
Filed Jan. 5, 1938 3 Sheets-Sheet 2
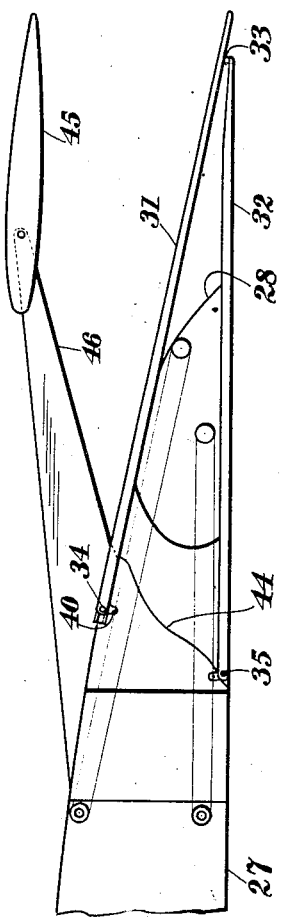
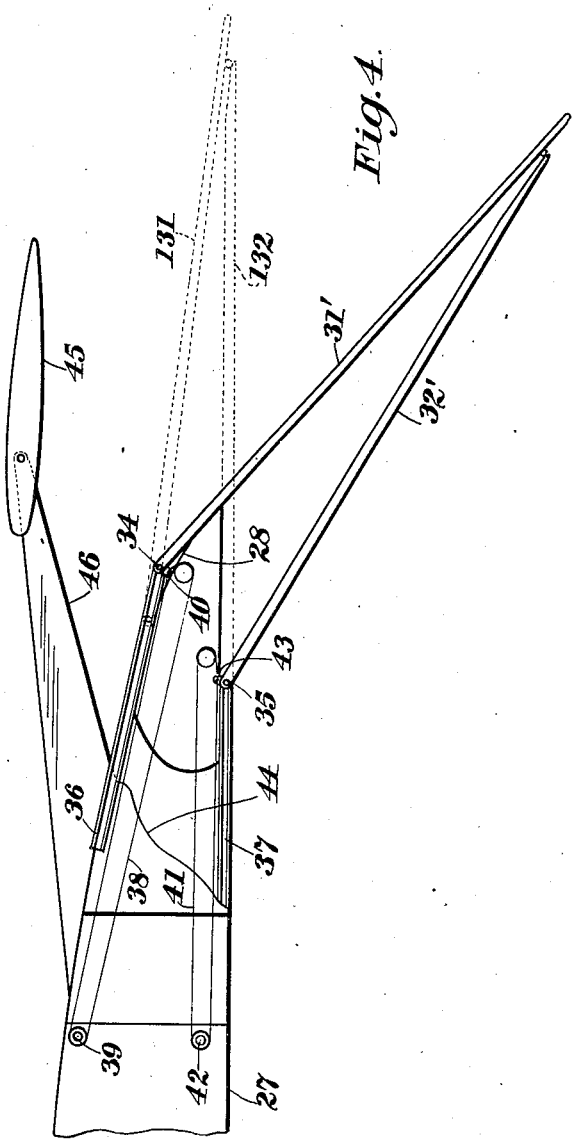
INVENTOR
Delmer S. Fahrney
BY
Ransom K. Davis
ATTORNEY

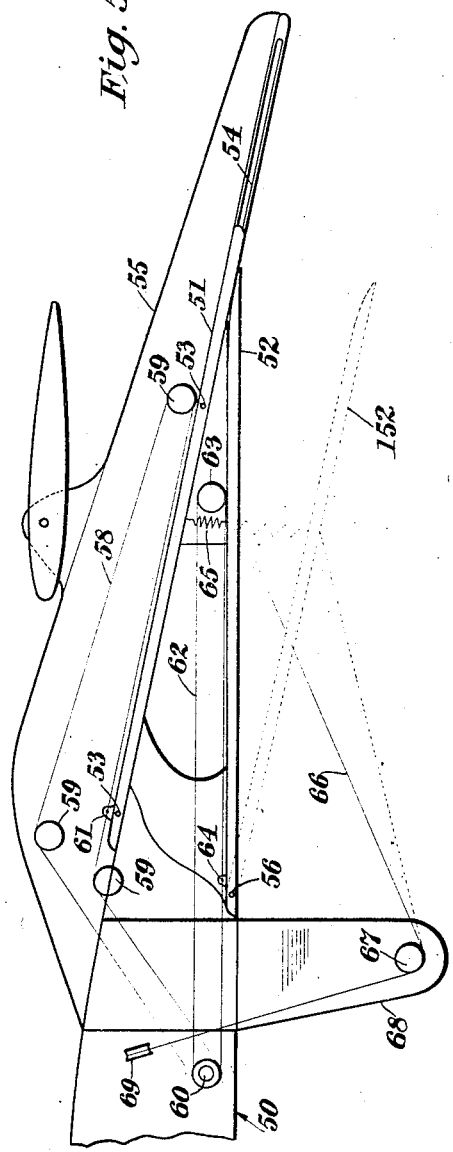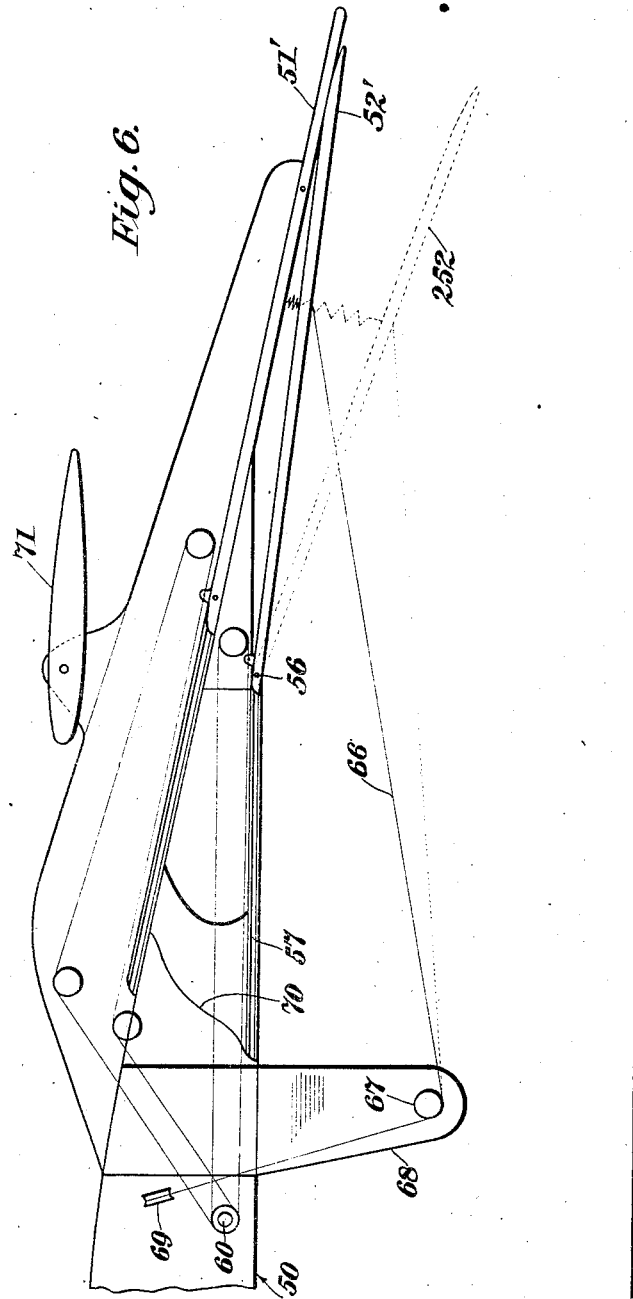

Patented Jan. 3, 1939

2,142,123

UNITED STATES PATENT OFFICE 2,142,123

EXTENSION WING FLAP

Delmer S. Fahrney, United States Navy

Application January 5, 1938, Serial No. 183,477

5 Claims. (Cl. 244—42)

(Granted under the act of March 3, 1883, as amended April 30, 1928; 370 O. G. 757)

This invention relates to an extension wing flap, and has for an object to provide an improved wedge type of wing flap extension, and in addition to provide a wing flap extension which, when placed in the extended position, will uncover a wing slot, permitting the slot to become operative.

A further object of this invention is to locate an aileron in the flow stream from the slot, so as to provide positive control at low speeds and high angles of attack.

Among the advantages provided by this invention are the use of an efficient slotted wing with the ability to close the slot when high speed is desired, the provision of additional area to the wing surface, the provision of a tapered cambered lower surface, and the addition of energy to the air stream over the upper surface at the most efficient place when the slot is uncovered and the wing is fully extended.

A further advantage is that the parts are easily operable with a minimum of friction, are light in weight and ample in strength, and that the parts serve to brace each other.

With the foregoing and other objects in view, the invention consists in the construction, combination and arrangement of parts hereinafter described and illustrated in the drawings, in which:

Fig. 3 is a schematic elevation of a slightly modified form of this invention;

Fig. 4 is a similar view to Fig. 3, with the flap moved to the extended position;

Fig. 5 is a schematic end elevation of still another form of this invention; and Fig. 6 is a view similar to Fig. 5, with the wing flap moved to the extended position.

Figure 1:
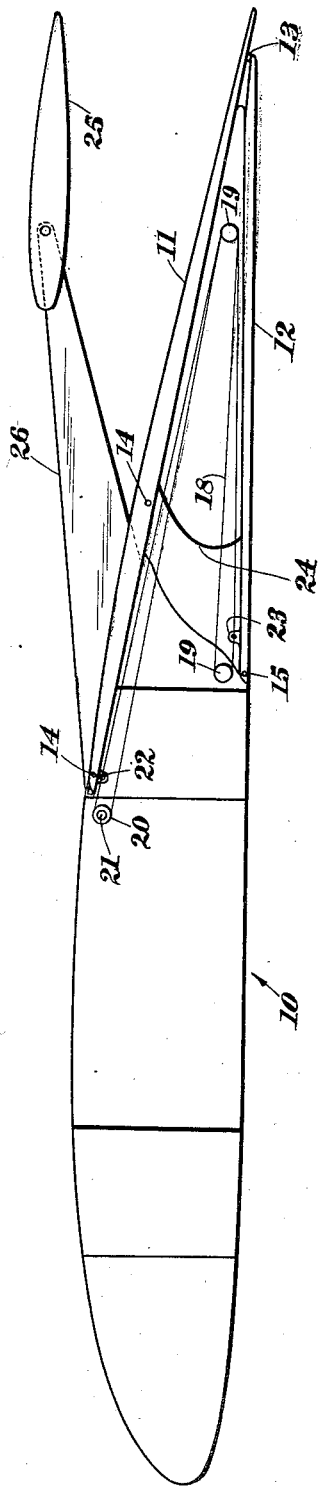
Fig. 1 is a schematic end elevation of an aircraft wing to which the wing extension of this invention has been applied.

There is shown at 10 an aircraft wing to which the wing flap extension of this invention has been applied. This wing flap extension includes an upper wedge plate 11 and a lower wedge plate 12, which plates are recessed or countersunk within the upper and lower after surfaces of the wing 10 so that the outer surfaces of the plates 11 and 12 form an airfoil continuation of the airfoil surface of the wing. The plates 11 and 12 are hinged to each other, as at 13. The plates 11 and 12 are provided with rollers 14 and 15 journaled within trackways 16 and 17 formed in a compression rib of the wing 10, it being noted that plate 11 has two rollers 14 in each trackway 16, while plate 12 has but one roller 15 in each trackway 17, it being obvious that as many trackways 16 and 17 will be provided as desirable, in order to furnish the necessary support.

Figure 2:
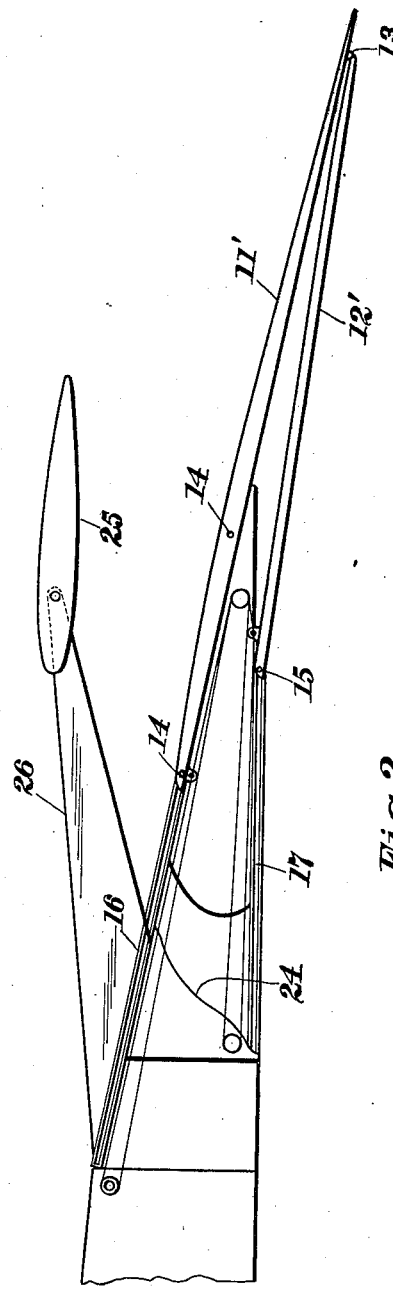
Fig. 2 shows the wing extension of Fig. 1 in the extended position.

The plates 11 and 12 are moved from their retracted position shown in Fig. 1 to the extended position 11' and 12', shown in Fig. 2, by means of an endless cable passing over sheaves 19 and a pulley wheel 20 on a control shaft 21, the cable 18 being secured to plate 11 by bracket 22 and to plate 12 by bracket 23.

A slot 24 extends through the wing 10, and an aileron 25 mounted on a support 26 is located in the flow stream through the slot 24 when the slot is open due to the plates 11 and 12 having been moved to the positions 11' and 12'.

In operation, the control shaft 21 is operated from the pilot's cockpit in any suitable manner, and can be rotated to extend or retract the plates 11 and 12. As the plates 11 and 12 move toward the extended positions 11' and 12', the plate 11 remains in the same plane, due to the presence of the two rollers 14 in the trackway 16. The plate 12, however, is secured at one end by the hinge 13 to the plate 11, and at the other end is mounted on roller 15 in trackway 17, thus permitting the hinge 13 to move the lower end of the plate 12 downwardly to the position 12' as the wedge plate wing extension is moved to this extended position shown in Fig. 2. When in this position, the slot 24 becomes operative and allows the air stream to flow therethrough to increase controllability at high angle of attack, while at the same time the wing area of the air craft wing 10 is increased and its camber is deepened, thus greatly decreasing the stalling point of the aircraft, permitting it to take off and land at much slower speeds. When high speed is desired in flight, the plates are returned to the retracted position shown in Fig. 1, reducing the wing area to normal.

The form of the invention shown in Figs. 3 and 4 differs from that shown in Figs. 1 and 2 by omitting one of the rollers 14 and by shortening the normal trailing edge of the aircraft wing 27 as at 28 within the plates forming the wing extension. The upper plate 31 is hinged to the lower plate 32 at 33. The upper plate 31 has a single roller 34 movable within a trackway 36, while the lower plate 32 has a single roller 35 movable within a trackway 37. A control cable 38 over control shaft 39 is connected by a bracket 40 to the upper plate 31, and a similar control cable 41 over control shaft 42 is connected by a bracket 43 to the lower plate 32.

A slot 44 extends through wing 27, being closed when the plates 31 and 32 are in the retracted position shown in Fig. 3, and adapted to be opened when the plates are in the extended position shown at 31' and 32' in Fig. 4, a control aileron 45 being mounted on a support 46 so as to be within the flow stream of the slot 44 when it is in operative position. The operation of this form of the invention is similar to that of the form above described, except that the pilot will operate two control shafts 39 and 42. These control shafts 39 and 42 may be operated somewhat independently of each other so as to not only extend the plates 31 and 32, but also to control the angle relative to each other after they have substantially reached their extended position. By thus differentially rotating the control shafts 39 and 42 the plates 31 and 32 may be caused to assume any position between the dash line position 131 and 132 and the full line position 31' and 32', shown in Fig. 4.

In Figs. 5 and 6, the upper plate 51 is not hinged to the lower plate 52, as in the previous forms, but is provided with a pair of rollers 53 in a trackway 54, which is outside of the contour of the aircraft wing 50, being located in what may be considered a vertical stabilizer fin 55. The lower plate 52 is provided with a single roller 56, movable within the trackway 57 adjacent the bottom of the aircraft wing 50. An endless cable 58 passes over sheave 59 to a control shaft 60 and is secured to the plate 51 at bracket 61, while the endless cable 62 passing over sheave 63 likewise passes over the same control shaft 60 and is anchored to the plate 52 by bracket 64.

A tension spring 65 is secured between the plates 51 and 52 and tends to hold the lower plate 52 yieldably against the upper plate 51, while a control cable 66 secured to the bottom of plate 52 intermediate its ends passes over a shaft 67 in a control post 68 to a control pulley 69.

In operation, control shaft 60 may be rotated to advance the plates 51 and 52 simultaneously from the position shown in Fig. 5 to the positions 51' and 52' shown in Fig. 6, the control pulley 69 being operated simultaneously to permit plate 52 to be so advanced. Control pulley 69 may also be operated to move the lower plate 52 to the dashed-outline position 152, shown in Fig. 5, against the compression spring 65, and may be likewise operated to move the plate 52 from the position 52' shown in Fig. 6 to the dashed-outline position 252.

In position 152 the camber of the wing 50 is increased without increasing its area, while in the position 52' the wing area is increased and the slot 70 is uncovered, permitting its air stream to reach the control aileron 71. The camber may also be deepened in addition to increasing in wing area by moving the lower plate from position 52' to position 252, as desired by the pilot.

It will be understood that the above description and accompanying drawings comprehend only the general and preferred embodiment of my invention and that various changes in construction, proportion and arrangement of parts may be made within the scope of the appended claims without sacrificing any of the advantages of my invention.

The invention described herein may be manufactured and/or used by or for the Government of the United States of America for governmental purposes without the payment of any royalties thereon or therefor.

Having thus set forth and disclosed the nature of this invention, what is claimed is:

1. An aircraft wing extension comprising a pair of plates adapted to be recessed into the upper and lower after airfoil surfaces of the aircraft wing to provide a normal airfoil wing contour, and means for moving said plates rearwardly to extend beyond the normal wing contour, said means including trackways in the upper and lower after wing surfaces, roller means on said plates guided within said trackways, and control cable means secured to said plates for positioning the same, said aircraft wing having a slot extending through its after surface, the wing slot being uncovered only when the plates are moved toward the extended position.

2. An aircraft wing extension comprising a pair of plates adapted to be recessed into the upper and lower after airfoil surfaces of the aircraft wing to provide a normal airfoil wing contour, and means for moving said plates rearwardly to extend beyond the normal wing contour, said means including trackways in the upper and lower after wing surfaces, roller means on said plates guided within said trackways, and control cable means secured to said plates for positioning the same, said aircraft wing having a slot extending through its after surface, the wing slot being uncovered only when the plates are moved toward the extended position, and a control aileron positioned in the path of the flow stream of the slot.

3. An aircraft wing extension comprising a pair of plates adapted to be recessed into the upper and lower after airfoil surfaces of the aircraft wing to provide a normal airfoil wing contour, and means for moving said plates rearwardly to extend beyond the normal wing contour, said means including trackways in the upper and lower after wing surfaces, roller means on said plates guided within said trackways, and control cable means secured to said plates for positioning the same, said plates being hinged together at their rear end, the roller means of said upper plate including a pair of rollers guided in a single trackway, while the roller means in said lower plate includes a single roller guided in a single trackway whereby in extended position the upper plate extends within the same plane, while the lower plate pivots about its roller to change its plane, and thereby deepen the camber of the aircraft plane.

4. An aircraft wing extension comprising a pair of plates adapted to be recessed into the upper and lower after airfoil surfaces of the aircraft wing to provide a normal airfoil wing contour, and means for moving said plates rearwardly to extend beyond the normal wing contour, said means including trackways in the upper and lower after wing surfaces, roller means on said plates guided within said trackways, and control cable means secured to said plates for positioning the same, the upper plate and lower plate being hinged together adjacent their rear end, the roller means in each plate comprising a single roller guided in a single trackway for each plate, cable means including a separate cable secured to each plate, and separate control shafts for each cable, said control shafts being differentially operable to move said upper and lower plates to an extended position, either continuing the normal contour of the wing or deepening the camber of the wing, according to the degree of differential operation.

5. An aircraft wing extension comprising a pair of plates adapted to be recessed into the upper and lower after airfoil surfaces of the aircraft wing to provide a normal airfoil wing contour, and means for moving said plates rearwardly to extend beyond the normal wing contour, said means including trackways in the upper and lower after wing surfaces, roller means on said plates guided within said trackways, and control cable means secured to said plate for positioning the same, the roller means of the upper plate including a pair of longitudinally spaced rollers guided in a single trackway, the roller means of the lower plate including a single roller guided in a single trackway, a yieldable means normally urging the rear ends of the plates together, and an additional cable means for pivoting said lower plate about its roller against the yieldable means, whereby the said plates may be moved to extended position to increase the wing area and whereby the lower plate may be pivoted in either extended or retracted position to increase the wing camber.

DELMER S. FAHRNEY.